(12) United States Patent
Kim et al.

(10) Patent No.: US 8,139,308 B2
(45) Date of Patent: *Mar. 20, 2012

(54) HARD DISK DRIVE, METHOD OF CONTROLLING FLYING HEIGHT OF MAGNETIC HEAD THEREOF, AND RECORDING MEDIUM CONTAINING COMPUTER PROGRAM THEREON

(75) Inventors: Young-Shin Kim, Seoul (KR); Hae Jung Lee, Suwon-si (KR); Chang-Hwan Lee, Seoul (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 759 days.

This patent is subject to a terminal disclaimer.

(21) Appl. No.: 12/108,679

(22) Filed: Apr. 24, 2008

(65) Prior Publication Data

US 2008/0266704 A1    Oct. 30, 2008

(30) Foreign Application Priority Data

Apr. 27, 2007    (KR) .................. 10-2007-0041365

(51) Int. Cl.
*G11B 21/02* (2006.01)
(52) U.S. Cl. ........................................................ 360/75
(58) Field of Classification Search .................. 360/59, 360/75, 69
See application file for complete search history.

(56) References Cited

U.S. PATENT DOCUMENTS

| 7,016,131 | B2 | 3/2006 | Liu et al. | |
|---|---|---|---|---|
| 7,038,875 | B2 | 5/2006 | Lou et al. | |
| 7,301,719 | B1 * | 11/2007 | Chen et al. | 360/69 |
| 7,542,227 | B2 * | 6/2009 | Che et al. | 360/75 |
| 7,583,467 | B2 * | 9/2009 | Lee | 360/75 |
| 2006/0103959 | A1 | 5/2006 | Lu | |
| 2008/0174902 | A1 * | 7/2008 | Kim et al. | 360/75 |
| 2008/0198497 | A1 * | 8/2008 | Lee et al. | 360/59 |
| 2008/0266703 | A1 * | 10/2008 | Kim et al. | 360/75 |
| 2009/0013203 | A1 * | 1/2009 | Chen et al. | 713/324 |

FOREIGN PATENT DOCUMENTS

| JP | 06-236641 | 8/1994 |
|---|---|---|
| KR | 2005-39586 | 4/2005 |

* cited by examiner

*Primary Examiner* — Fred Tzeng
(74) *Attorney, Agent, or Firm* — Stanzione & Kim, LLP

(57) ABSTRACT

A method of controlling a flying height of a magnetic head of a hard disk drive includes calculating a corrected flying on demand (FOD) voltage to correct a difference between a measured flying height measured by applying a burn-in FOD voltage corresponding to a target flying height and a burn-in flying height in a reference FOD voltage profile corresponding to the burn-in FOD voltage, using the reference FOD voltage profile, in the reference FOD voltage profile that is a profile of a second signal for calculating the flying height of the magnetic head with respect to a first signal for calculating an FOD voltage that allows an end of the magnetic head to thermally expand and protrude when applied to a heater included in the magnetic head, and applying an applied FOD voltage obtained by applying the corrected FOD voltage, to the burn-in FOD voltage, to control the flying height of the magnetic head. Thus, the reliability in the read/write operation can be improved and performance of the hard disk drive can be improved.

15 Claims, 9 Drawing Sheets

HARD DISK DRIVE, METHOD OF CONTROLLING FLYING HEIGHT OF MAGNETIC HEAD THEREOF, AND RECORDING MEDIUM CONTAINING COMPUTER PROGRAM THEREON

CROSS-REFERENCE TO RELATED APPLICATIONS

This application claims the priority of Korean Patent Application No. 10-2007-0041365, filed on 27 Apr. 2007, in the Korean Intellectual Property Office, the disclosure of which is incorporated herein by reference in its entirety.

BACKGROUND OF THE INVENTION

1. Field of the Invention

The present general inventive concept relates to a hard disk drive, a method of controlling the flying height of a magnetic head of the hard disk drive, and a recording medium recording a computer program executing the method, and more particularly, to a hard disk drive which can actively control the flying height of a magnetic head, a method of controlling the flying height of a magnetic head of the hard disk drive, and a recording medium recording a computer program executing the method.

2. Description of the Related Art

Hard disk drives (HDDs) formed of electronic parts and mechanical parts are one of memory devices for recording and reproducing data by converting digital electric pulses to a magnetic field that is more permanent. The HDD is widely used as one of auxiliary memory devices for a computer system because of its fast access time to a large amount of data.

With the recent increase in TPI (tracks per inch) and BPI (bits per inch), the HDD has achieved a high storage capacity and its application field has expanded. As the storage capacity of the HDD continues to increase, the size of a read/write sensor of a magnetic head decreases and a flying height FH of the magnetic head flying above a recording surface of a disk gradually decreases. That is, when high TPI and BPI are embodied to manufacture an HDD with a high storage capacity, the width of a track decreases, and accordingly the strength of a magnetic field decreases in proportional thereto. Thus, when the FH of a magnetic head increases, the detection of a magnetic head is difficult so that the operation of the HDD is not smooth.

In this regard, a study on a method of effectively reducing the FH of a magnetic head with respect to a disk by appropriately controlling the FH of the magnetic head is widely performed and one of the methods is the flying on demand (FOD) method. The FOD is a method of controlling the FH of a magnetic head using a reduction characteristic of the FH of a magnetic head generated during thermal expansion of a pole tip that is an end portion of the magnetic head, during the operation of the HDD, by applying a constant voltage, that is, an FOD voltage, to a heater coil included in the magnetic head.

Recently, a reference FOD voltage (or an FOD current or FOD power) profile indicating a relationship between the FH of a magnetic head and an FOD voltage is calculated using an FOD apparatus in a burn-in process. The FOD voltage is selected to maintain a desired FH of a magnetic head in a user's environment based on the reference FOD voltage profile. In detail, in the burn-in process, when a gradually increasing FOD voltage is applied to the magnetic head through a touch down test, the magnetic head maintaining a flying state at a predetermined height is gradually lowered toward the disk and is finally touched down on the disk. The reference FOD voltage profile indicating the relationship between the FOD voltage and the FH of the magnetic head is provided through the touch down test.

A target clearance, that is, an FOD voltage needed for a target FH, in an actual user environment is calculated from the reference FOD voltage profile, and related data is stored in a maintenance cylinder of a disk. Thus, the FOD voltage calculated in the burn-in process is applied to the heater included in the magnetic head in the user environment so that a target FH of the magnetic head is maintained.

However, environments where the HDD is actually used are quite various so as not to be the same as the environment of the burn-in process. Accordingly, when the FOD voltage needed for a target FH, which is selected based on the reference FOD voltage profile provided in the burn-in process, as described above, is applied to the user environment where the HDD is actually in use, the FH of the magnetic head may vary according to the environment where the HDD is used. In particular, since a temperature sensor is generally included in the HDD, even when the effect by a temperature is compensated for to a degree by measuring a change in the temperature using the temperature sensor, it is very difficult to reflect a change in the altitude or humidity, or other environmental factors that affect the FH of the magnetic head.

When the HDD is used in the user environment based on the FOD voltage measured in the burn-in process, the target FH of the magnetic head may not be maintained due to an effect of a combination of various environment variables. When the target FH of the magnetic head is not maintained, a problem of weak write or head/disk interference (HDI) can be generated so that the reliability of FOD is deteriorated.

Thus, since the target FH of the magnetic head cannot be maintained with the FOD voltage selected based on the touch down test in the burn-in process due to complex issues of various environment variables, there is a demand to appropriately address these and other related problems.

BRIEF SUMMARY

The present general inventive concept provides a hard disk drive (HDD) which can effectively prevent various factors, for example, temperature, humidity, and altitude, etc., affecting the FH of the magnetic head in a user environment so that reliability of a read/write operation can be improved and the performance of the hard disk drive is improved, a method of controlling the FH of a magnetic head of the HDD, and a recording medium to record a computer program executing the method.

Additional and/or other aspects and advantages of the present general inventive concept will be set forth in part in the description which follows and, in part, will be obvious from the description, or may be learned by practice of the general inventive concept.

The foregoing and/or other aspects and utilities of the present general inventive concept are achieved by providing a method of controlling a flying height of a magnetic head of a hard disk drive, the method including calculating a corrected flying on demand (FOD) voltage to correct a difference between a measured flying height measured by applying a burn-in FOD voltage corresponding to a target flying height and a burn-in flying height in a reference FOD voltage profile corresponding to the burn-in FOD voltage, using the reference FOD voltage profile, in the reference FOD voltage profile that is a profile of a second signal to calculate the flying height of the magnetic head with respect to a first signal to calculate an FOD voltage that allows an end of the magnetic head to thermally expand and protrude when applied to a heater included in the magnetic head, and applying an applied FOD voltage obtained by applying the corrected FOD voltage, to the burn-in FOD voltage, to control the flying height of the magnetic head.

The calculating of a corrected FOD voltage may include measuring the second signal by applying the burn-in FOD voltage, correcting a value of the second signal measured at a current temperature to a value of the second signal at a temperature at which the reference FOD voltage profile is produced and calculating the corrected FOD voltage to correct a difference between the burn-in flying height and a measured flying height that is calculated based on the corrected value of the second signal, using the reference FOD voltage profile.

In the correcting of a value of the second signal measured at a current temperature to a value of the second signal at a temperature at which the reference FOD voltage profile is produced, the correction of the value of the second signal is performed based on a profile statistically calculated with respect to a plurality of magnetic heads and by matching the value of the second signal when the magnetic head touches down on a disk to a corresponding temperature.

The temperature at which the reference FOD voltage profile is produced is preset and works as a reference temperature.

The calculating the corrected FOD voltage to correct a difference between the burn-in flying height and a measured flying height that is calculated based on the corrected value of the second signal, using the reference FOD voltage profile, may include symmetrically moving the corrected value of the second signal with respect to the reference FOD voltage profile, calculating a first signal calculation value corresponding to the value of the second signal that is symmetrically moved, in the reference FOD voltage profile, and calculating the corrected FOD voltage based on the difference between the first signal calculation value and a first signal burn-in value corresponding to the burn-in FOD voltage in the reference FOD voltage profile.

After the calculating of a corrected FOD voltage and when it is an idle time, the method may further include recalculating the corrected FOD voltage when a difference between a current temperature and a temperature when the calculating of a corrected FOD voltage is performed exceeds a preset range or a difference between a current time and a time when the calculating of a corrected FOD voltage is performed exceeds a preset range.

The reference FOD voltage profile is produced in a burn-in process that is one of manufacturing processes of a hard disk drive and stored in a maintenance cylinder of a disk.

The foregoing and/or other aspects and utilities of the present general inventive concept are also achieved by providing a method of controlling a flying height of a magnetic head of a hard disk drive, the method including calculating a target flying on demand (FOD) voltage for a target flying height in an environment in which a measured flying height is measured by correcting a difference between the measured flying height measured by applying a burn-in FOD voltage corresponding to the target flying height and a burn-in flying height in a reference FOD voltage profile corresponding to the burn-in FOD voltage, using the reference FOD voltage profile, in the reference FOD voltage profile that is a profile of a second signal to calculate the flying height of the magnetic head with respect to a first signal to calculate an FOD voltage that allows an end of the magnetic head to thermally expand and protrude when applied to a heater included in the magnetic head, and applying the target FOD voltage to control the flying height of the magnetic head.

The foregoing and/or other aspects and utilities of the present general inventive concept are also achieved by providing a recording medium that has recorded thereon a computer program to execute any of the above methods of controlling a flying height of a magnetic head of a hard disk drive.

The foregoing and/or other aspects and utilities of the present general inventive concept are also achieved by providing a hard disk drive including a magnetic head to record data on a disk or reproduce recorded data, and a controller to calculate a corrected flying on demand (FOD) voltage to correct a difference between a measured flying height measured by applying a burn-in FOD voltage corresponding to a target flying height and a burn-in flying height in a reference FOD voltage profile corresponding to the burn-in FOD voltage, using the reference FOD voltage profile, in the reference FOD voltage profile that is a profile of a second signal to calculate the flying height of the magnetic head with respect to a first signal to calculate an FOD voltage that allows an end of the magnetic head to thermally expand and protrude when applied to a heater included in the magnetic head, and to apply an applied FOD voltage obtained by applying the corrected FOD voltage, to the burn-in FOD voltage, to control the flying height of the magnetic head.

The controller calculates the corrected FOD voltage to correct a difference between the burn-in flying height and the measured flying height, using the reference FOD voltage profile, by correcting a value of the second signal measured at a current temperature by applying the burn-in FOD voltage to a value of the second signal at a temperature at which the reference FOD voltage profile is produced, and using the flying height calculated by the corrected value of the second signal as the measured flying height.

The controller corrects the value of the second signal based on a profile statistically calculated with respect to a plurality of magnetic heads and by matching the value of the second signal when the magnetic head touches down on a disk to a corresponding temperature.

The temperature at which the reference FOD voltage profile is produced is preset and works as a reference temperature.

When it is an idle time, the controller recalculates the corrected FOD voltage when a difference between a current temperature and a temperature when the calculating of a corrected FOD voltage is performed exceeds a preset range or a difference between a current time and a time when the calculating of a corrected FOD voltage is performed exceeds a preset range.

The reference FOD voltage profile is produced in a burn-in process that is one of manufacturing processes of a hard disk drive and stored in a maintenance cylinder of a disk.

BRIEF DESCRIPTION OF THE DRAWINGS

The above and/or other aspects and advantages of the present general inventive concept will become apparent and more readily appreciated from the following detailed description, taken in conjunction with the accompanying drawings of which.

DETAILED DESCRIPTION OF THE PREFERRED EMBODIMENTS

Figure 1:
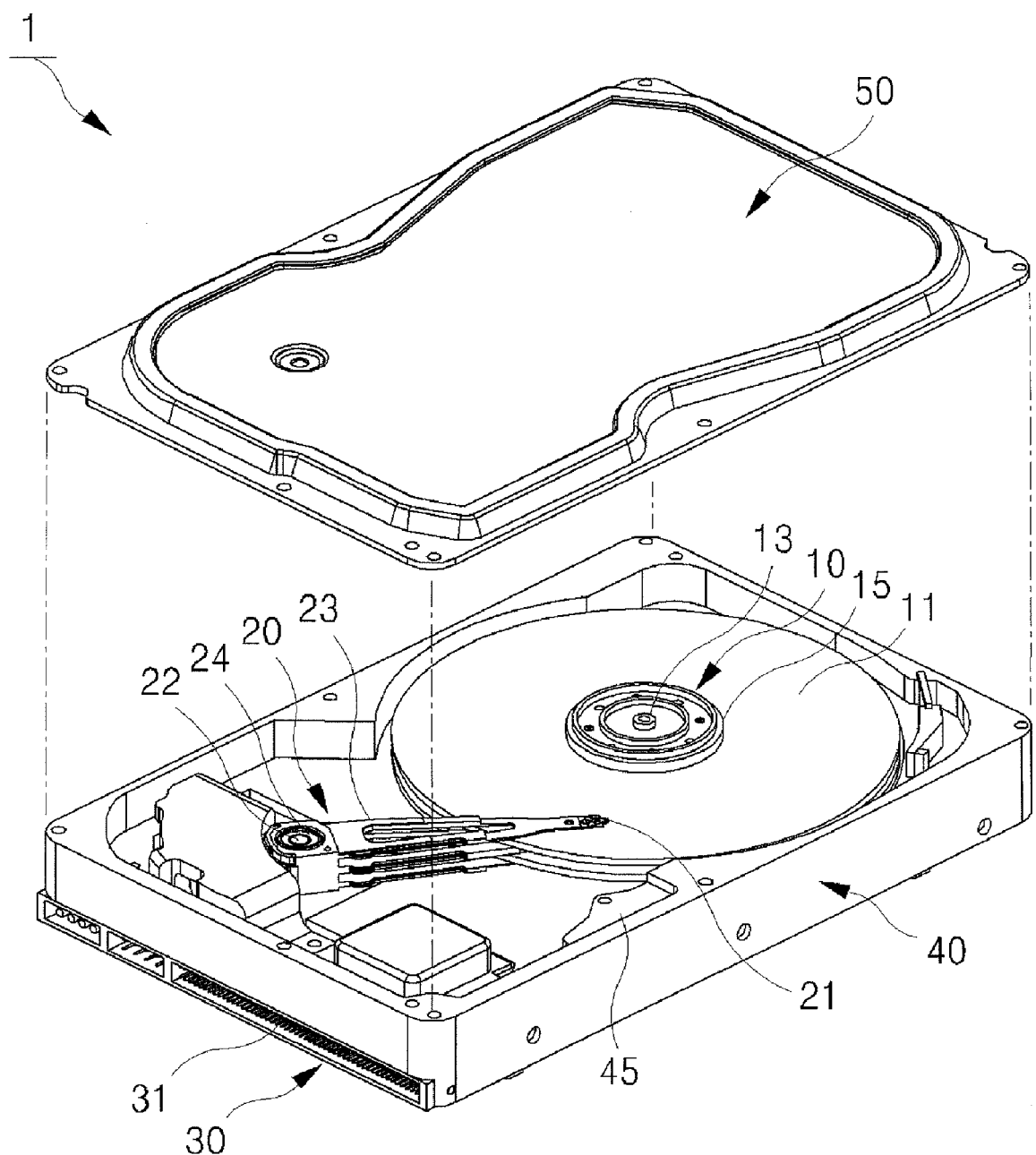
FIG. 1 is a partially exploded perspective view of a hard disk drive according to an embodiment of the present general inventive concept.

Reference will now be made in detail to embodiments of the present general inventive concept, examples of which are illustrated in the accompanying drawings, wherein like reference numerals refer to the like elements throughout. The embodiments are described below in order to explain the present invention by referring to the figures.

FIG. 1 is a partially exploded perspective view of a hard disk drive HDD 1 according to an embodiment of the present general inventive concept. Referring to FIG. 1, the HDD 1 includes a disk pack 10 having at least one disk 11 to record data, a head stack assembly HSA 20 having a magnetic head 21 to read and reproduce data with respect to the disk 11, a printed circuit board assembly PCBA 30, a base 40 on which the above elements are assembled, and a cover 50 to cover the base 40.

The disk pack 10 is an assembly where data is recorded and on which the disks 11 are fixed on the same shaft. In the present embodiment, the disk pack 10 includes a plurality of circular disks 11, a shaft 13 forming a rotation center, a spindle motor hub (not shown) supporting the disks 11 and rotated with the disks 11, a clamp 15 coupled to an upper portion of the spindle motor hub, and a clamp screw (not shown) to press the clamp 15 to allow the disks 11 to be fixed to the spindle motor hub.

The HSA 20 includes the magnetic head 21 to write data to the disk 11 or to read recorded data from the disk 11, an actuator arm 23 to pivot on the disk 11 around a pivot shaft 22 to enable the magnetic head 21 to access the data on the disk 11, a pivot shaft holder 24 to rotatably support the pivot shaft 22, where the actuator arm 23 is coupled and supported, and a bobbin (not shown) provided in a direction opposite to the actuator arm 23 with respect to the pivot shaft holder 24, located between a voice coil motor VCM (not shown) and magnets (not shown), and having a VCM coil (not shown) wound around the bobbin.

The magnetic head 21 reads or records information with respect to the disk 11 that is being rotated, by detecting a magnetic field formed on the surface of the disk 11 or magnetizing the surface of the disk 11. The magnetic head 21 includes a read head (not shown) to detect the magnetic field of the disk 11 or a write head (not shown) to magnetize the disk 11 to read and write data.

The VCM is a drive motor to pivot an actuator arm 23 to move the magnetic head 21 to a desired position on the disk 11 using the Fleming's left hand rule, that is, a force is generated when a current is applied to a conductive body existing in a magnetic field. As a current is applied to the VCM coil located between the magnets, a force is applied to the bobbin so that the bobbin is rotated. Accordingly, as the actuator arm 23 extending in a direction opposite to the bobbin from the pivot shaft holder 24 pivots, the magnetic head 21 supported at a tip end of the actuator arm 23 is moved in a radial direction on the disk 11 that is rotated, searches for a track, accesses the searched track, and performs signal process of the accessed information.

The PCBA 30 includes a printed circuit board PCB (not shown) having a plate shape and a PCB connector 31 provided at one side of the PCB. A plurality of chips (not shown) and circuits (not shown) to control the disk 11 and the magnetic head 21 are provided on the PCB. The PCB connector 21 is used to communicate with external devices.

The base 40 constitutes a frame, on which the above-described parts such as the disk pack 10, the HSA 20, and the PCBA 30 are assembled. Also, a ramp 45, where the magnetic head 21 is parked when power is discontinued, is installed on the base 40.

The cover 50 covers the upper surface of the base 40 to protect the disk pack 10 and the HSA 20. In the present embodiment, the cover 50 is manufactured of aluminum and protects the parts assembled on the base 40 and effectively dissipates heat from the inside of the base 40. The above-described constituent elements are operated by drive circuits which are described below.

Figure 2:
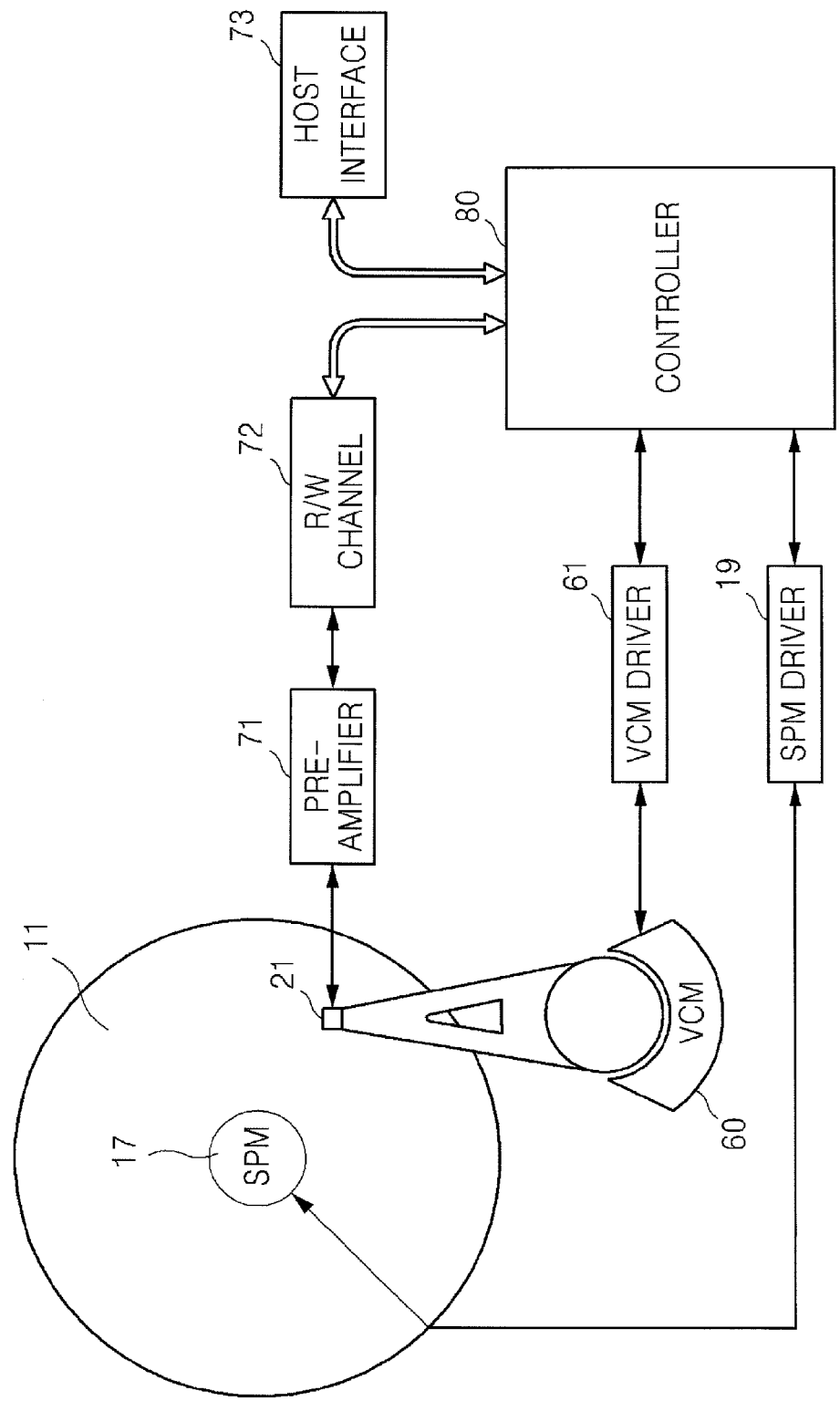
FIG. 2 is a block diagram of a drive circuit of the hard disk drive of FIG. 1 adopting a method of controlling a flying height of a magnetic head of the hard disk drive according to an embodiment of the present general inventive concept.

FIG. 2 is a block diagram of a drive circuit of the hard disk drive of FIG. 1 adopting a method of controlling a flying height of a magnetic head of the hard disk drive according to an embodiment of the present general inventive concept. Referring to FIG. 2, the HDD 1 as a drive circuit includes a pre-amplifier (Pre-AMP) 71, a read/write (R/W) channel 72, a host interface 73, a voice coil driver 61, a spindle motor (SPM) driver 19, and 1 controller 80.

The Pre-AMP 71 amplifies a read signal generated by the read head that detects a magnetic field from the disk 11 and outputs the amplified read signal to the R/W channel 72, or amplifies a current of a particular waveform received from the R/W channel 72 and supplies the amplified current to the write head.

The R/W channel 72 converts the read signal amplified by the pre-amplifier 71 to a digital signal and outputs the converted read signal to the controller 80. Also, the R/W channel 72 receives the data that is received by a host interface 73 via the controller 80, converts the received data to an analog signal, and outputs the analog signal to the pre-amplifier 71.

The host interface 73 transmits the converted digital signal to a host device (not shown) in a data reading mode and receives the data input by a user from the host device and outputs the received data to the controller 80 in a data recording mode. The term "host device" is used to collectively refer to a component, like a CPU or I/O controller of a computer, which controls and operates an overall computer system including the HDD 1.

The VCM driver 61 controls the amount of a current applied to the VCM 60 according to the control of the controller 80. The SPM driver 19 controls the amount of a current applied to a spindle motor 17 according to the control of the controller 80.

The controller 80 receives, via the host interface 73, data input by the user through the host device and outputs the received data to the R/W channel 72 in the data recording mode, and receives a read signal converted to a digital signal by the R/W channel 72 and outputs the received signal to the host interface 73 in the data reading mode. Also, the controller 80 controls outputs of the VCM driver 61 and the spindle motor driver 19.

The controller 80 can be a microprocessor or a microcontroller and can be implemented in a form of software or firmware that executes a method of controlling the flying height FH of the magnetic head 21 of the HDD 1, which will be described later.

The controller 80 calculates a corrected flying on demand (FOD) voltage to correct a difference between a measured FH (measured by applying a burn-in FOD voltage corresponding to a target FH) and a burn-in FH in a reference FOD voltage profile corresponding to the burn-in FOD voltage and applies an applied FOD voltage obtained by applying the corrected FOD voltage, to the burn-in FOD voltage, to control the FH of the magnetic head 21, in the reference FOD voltage profile that is a profile of a second signal to calculate the FH of the magnetic head 21 with respect to a first signal to calculate an FOD voltage that allows the end of the magnetic head 21 to thermally expand and protrude when applied to a heater (not shown) included in the magnetic head 21. Thus, regardless of external factors, for example, the temperature, humidity, or altitude, affecting the FH of the magnetic head 21, the difference between an actual FH of the magnetic head 21 in a user environment and the FH of the magnetic head 21 in the burn-in process is corrected. Also, a target FH of the magnetic head 21 can be maintained by applying the FOD voltage which can maintain the target FH of the magnetic head in a current environment.

The method of controlling the FH of the magnetic head 21 of the HDD 1 according to an embodiment of the present general inventive concept will now be described below with reference to FIGS. 3 through 9. The process of manufacturing the HDD 1 may include six processes of a mechanical assembly process, including a servo write process, a function test process, a burn-in process, a final test process, a releasing test process, and a packaging and releasing process.

First, the reference FOD voltage profile that is a profile of a second signal to calculate the FH of the magnetic head 21 with respect to a first signal to calculate the FOD voltage is produced by performing a touch down test in the burn-in process of the manufacturing process of the HDD 1. The first signal is an FOD voltage (or an FOD current or FOD power) signal or a signal corresponding thereto and the second signal may be a harmonic value, a pulse width, or a servo auto gain control SAGC.

Figure 4:
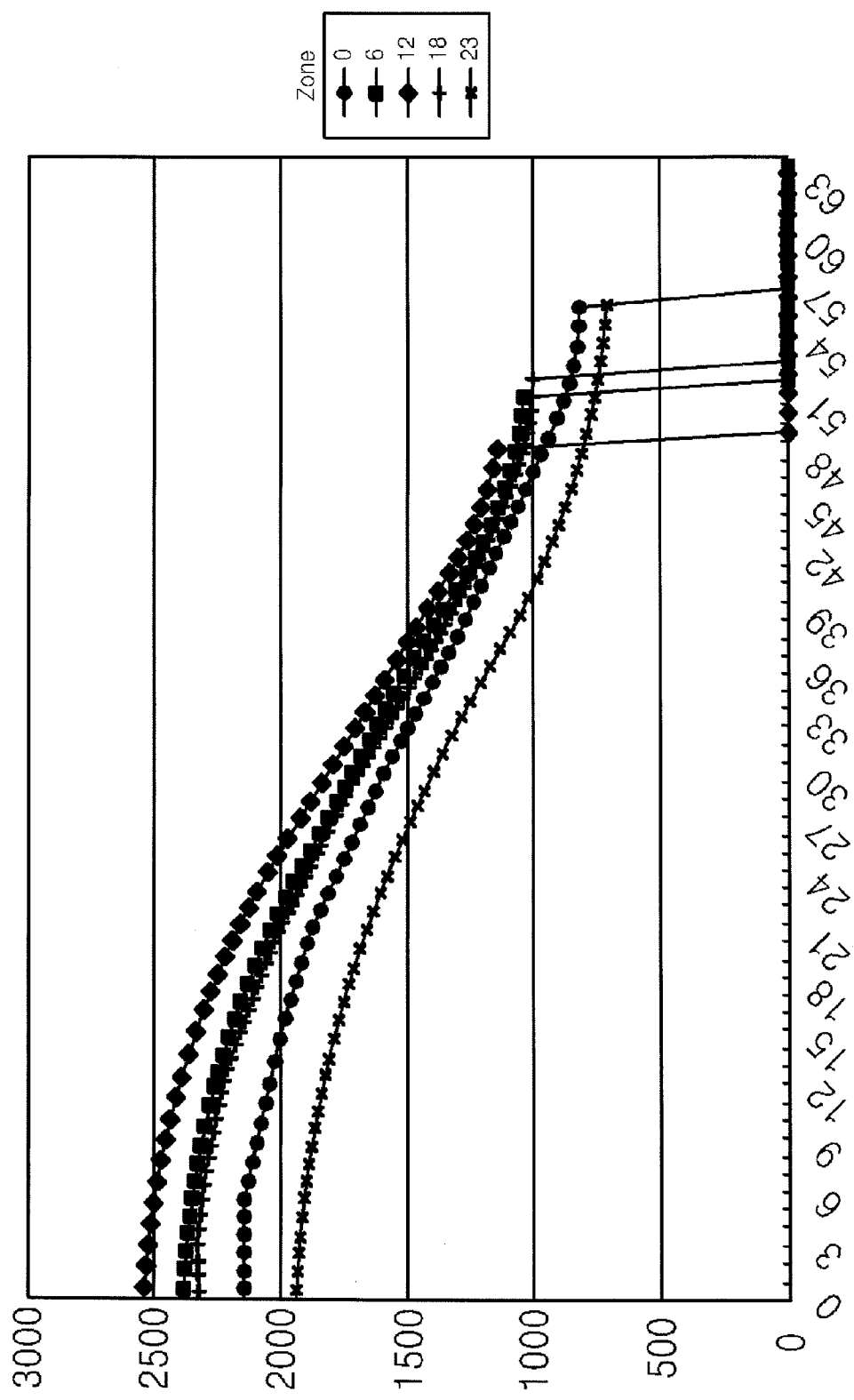
FIG. 4 is a graph showing an example of a reference FOD voltage profile provided in a burn-in process.

FIG. 4 is a graph illustrating an example of a reference FOD voltage profile produced in a burn-in process. A plurality of reference FOD voltage profiles illustrated in FIG. 4 are about zones 0, 6, 12, 18, and 23 on the disk 11. Data about the reference FOD voltage profile produced in the burn-in process, that is, the data including the FOD voltage (the burn-in FOD voltage) to be applied during the read/write operation in the user environment, is stored in a maintenance cylinder on the disk 11.

Figure 3:
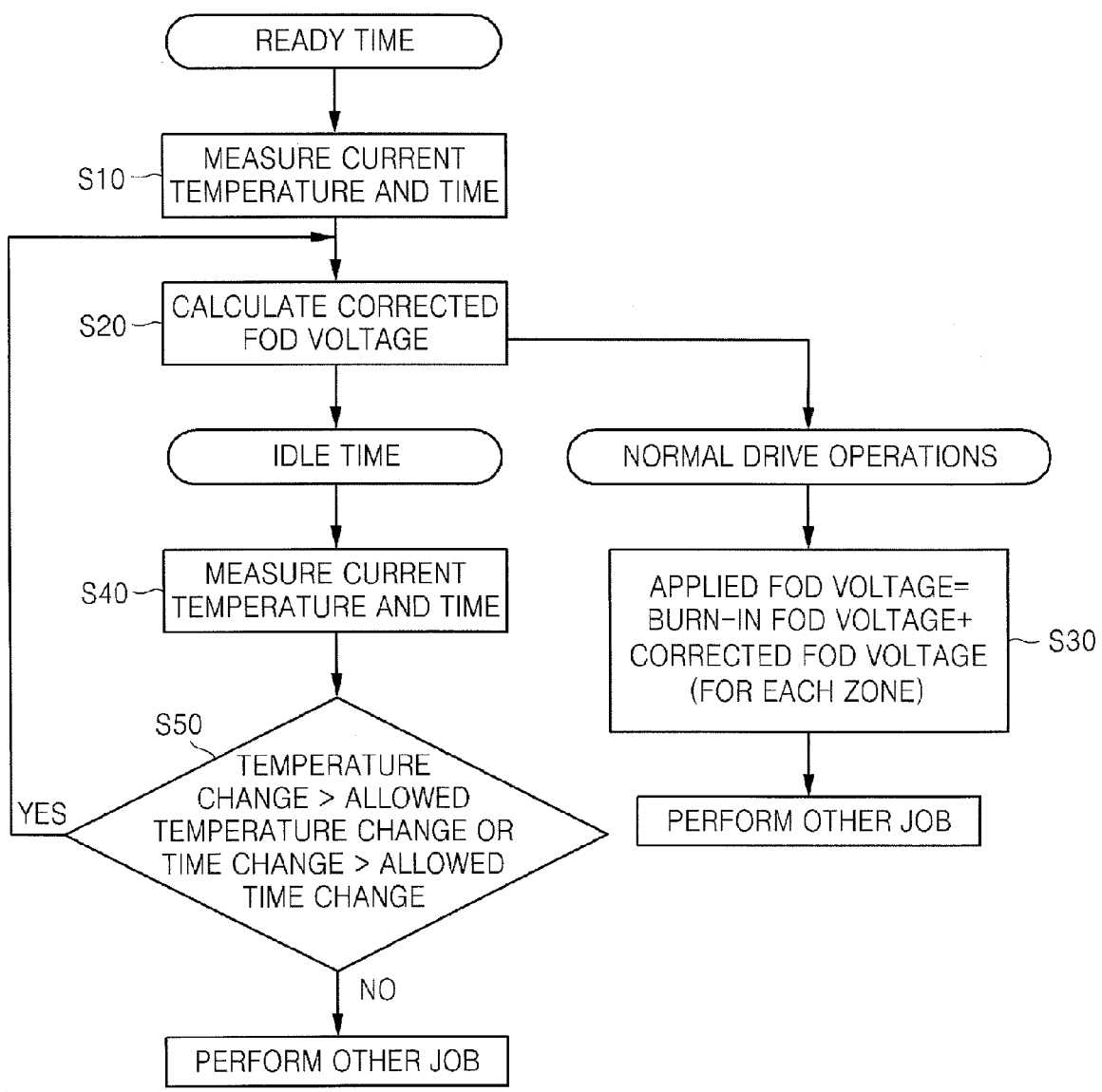
FIG. 3 is a flowchart explaining a method of controlling a flying height of a magnetic head of the hard disk drive according to an embodiment of the present general inventive concept.

Referring to FIG. 3, first, the current temperature and time are measured (operation S10). The current temperature and time is generally measured during the calculation of the corrected FOD voltage in order to measure the temperature and time when the corrected FOD voltage is calculated. Then, a corrected FOD voltage is calculated by applying the burn-in FOD voltage set in the burn-in process when it is a ready time in the user environment (operation S20). The burn-in FOD voltage set in the burn-in process is the FOD voltage in the reference FOD voltage profile corresponding to the target FH when the magnetic head 21 performs the read/write operation. The FOD voltage can be differently set when the magnetic head 21 performs a read operation or a write operation.

When the process of calculating the corrected FOD voltage is performed, the value of the second signal is measured by applying the burn-in FOD voltage. The value of the second signal can be various values as described above. The value of the second signal, like a harmonic value, can be affected by temperature. In this case, the value of the second signal may not directly correspond to the FH. That is, when the temperature in the burn-in process in which the reference FOD voltage profile is produced and the temperature during the measurement of the value of the second signal by applying the burn-in FOD voltage in the user environment are different from each other, and the value of the second signal is changed by the difference in the temperature, the measured FH that is the current FH cannot be calculated directly from the measured value of the second signal. Thus, the change in the value of the second signal due to the change in the temperature must be corrected in order to calculate the measured FH that is the accurate current FH of the magnetic head, from the value of the second signal.

Figure 5:
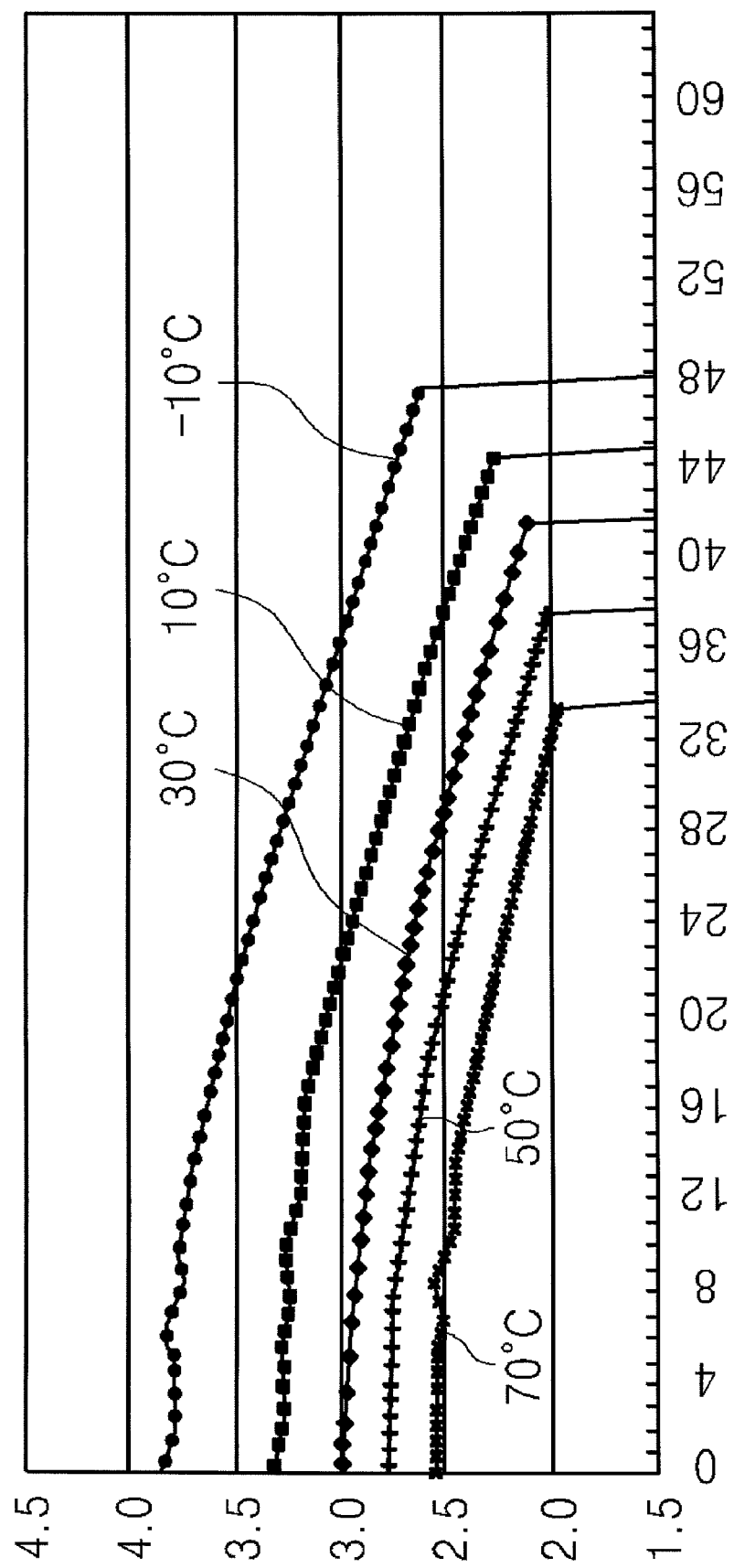
FIGS. 5 through 6 are graphs explaining the control of a temperature of a second signal value measured by applying a burn-in FOD voltage.

The method of correcting the change in the value of the second signal due to the change in the temperature will be described below. The reference FOD voltage profile that is a profile of the second signal with respect to the first signal is obtained at different temperatures, for example, −10° C., 10° C., 30° C., 50° C., and 70° C., as illustrated in FIG. 5.

According to a result of performing a touch down test at different temperatures, it is difficult to determine a degree of the influence by the value of the second signal due to the temperature because a touch down FOD voltage for the touch down varies and the initial FH of the magnetic head 21 is different. However, although the initial height of the magnetic head 21 according to the temperature may be different, since the touch down FOD voltage refers to a voltage when the magnetic head 21 contacts the disk 11, the distance (clearance) between the magnetic head 21 and the disk 11 during the touch down is 0. That is, the position of the magnetic head 21 is the same at all temperatures at the touch down FOD voltage.

Figure 6:
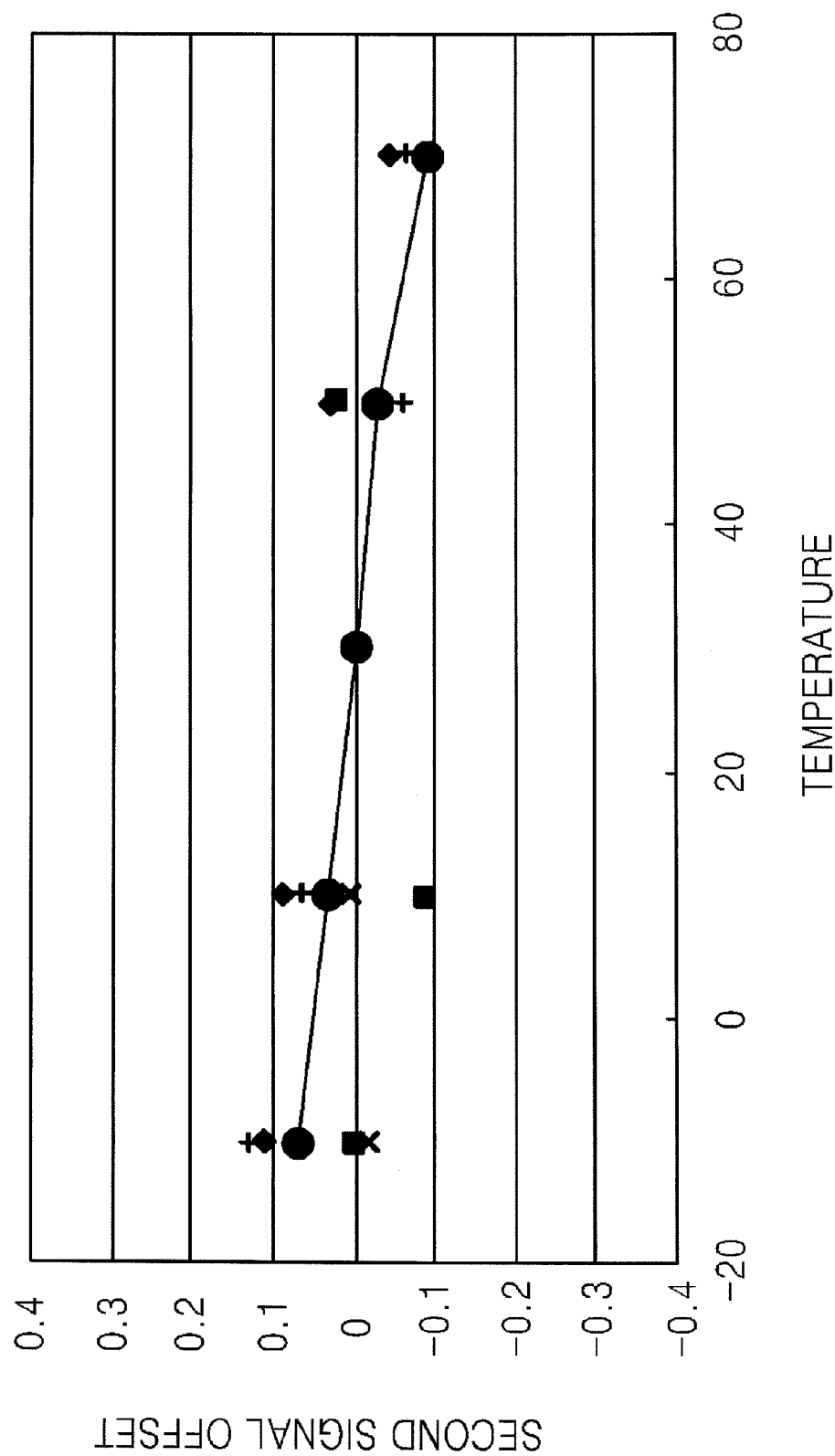

Thus, the value of the second signal that is different according to the temperature can be obtained by gathering graphs at a point where the clearance between the magnetic head 21 and the disk 11 is 0. The value of the second signal changed with respect to each temperature as illustrated in FIG. 6 can be defined as an average value of a plurality of magnetic heads 21.

Figure 7:
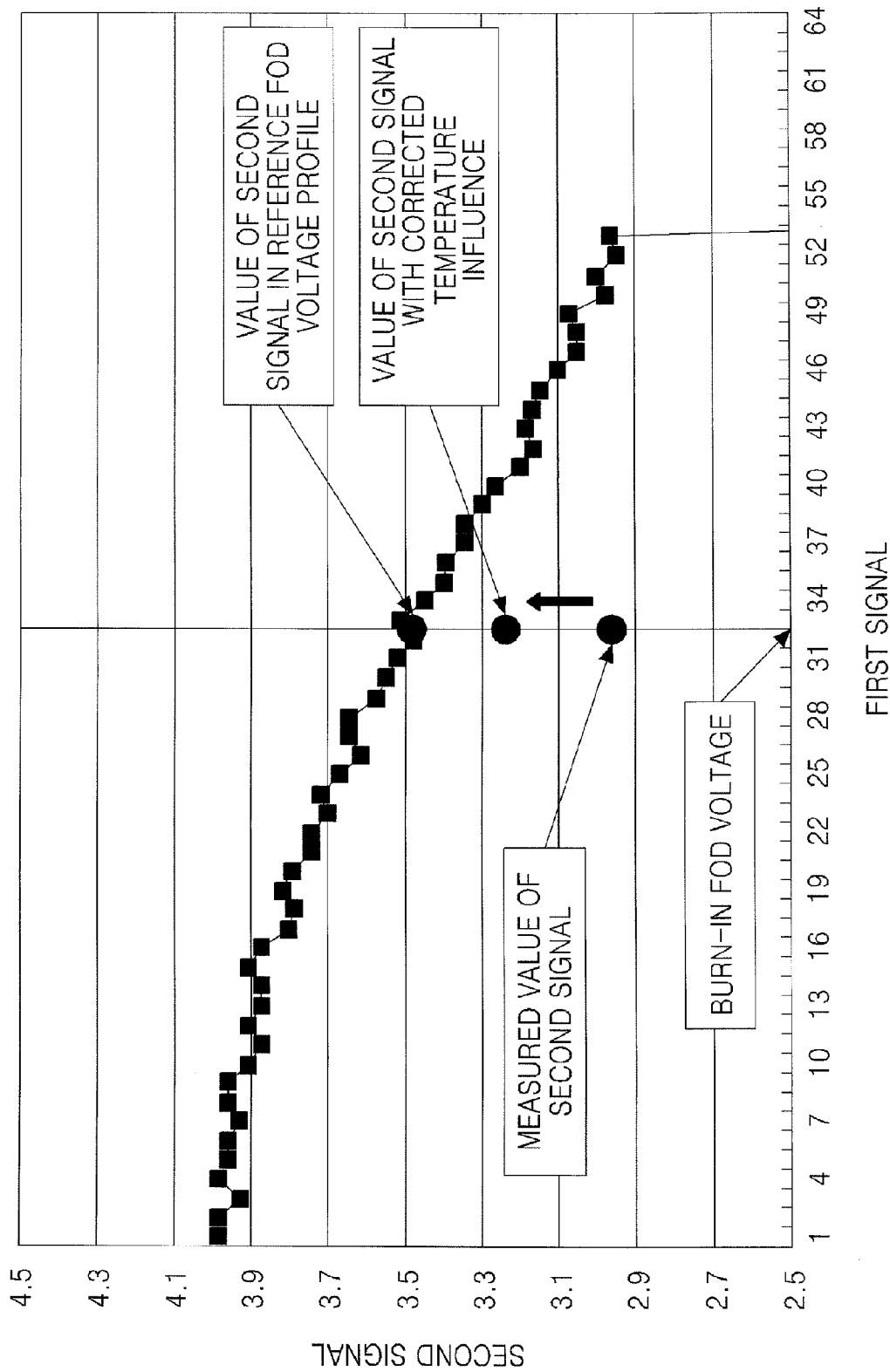
FIGS. 7 through 9 are graphs explaining the process of calculating a corrected FOD voltage in the method of controlling a flying height of a magnetic head of the hard disk drive according to an embodiment of the present general inventive concept.

Thus, the amount of a change in the value of the second signal due to the change in temperature can be corrected by using the above definition. That is, the value of the second signal, in which the influence by the temperature is corrected by subtracting the amount of change of the value of the second signal due to the temperature based on the graph of FIG. 6 from the value of the second signal measured by applying the burn-in FOD voltage, can be calculated as illustrated in FIG. 7.

Figure 8:
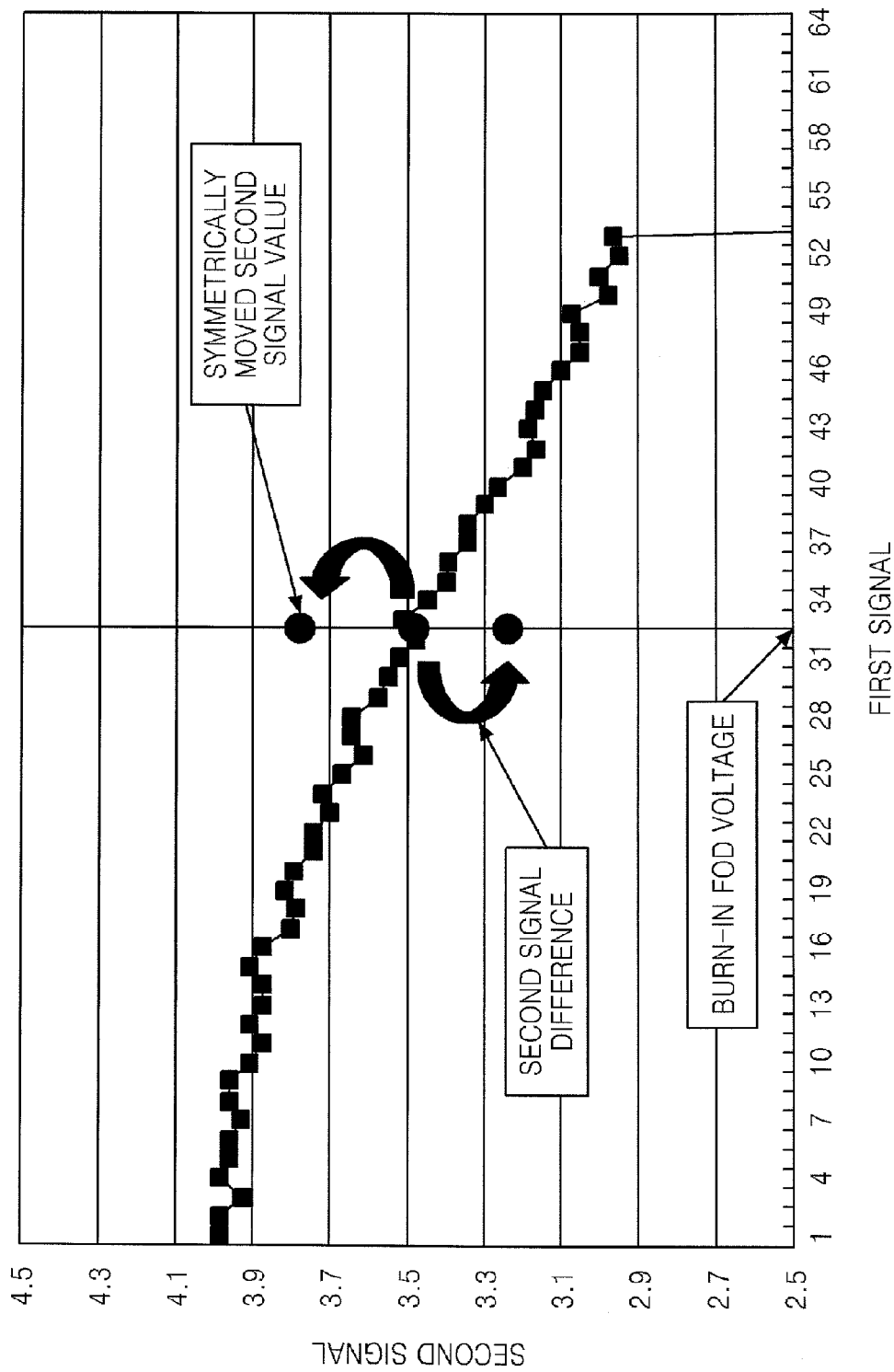

Then, the corrected value of the second signal is symmetrically moved with respect to the reference FOD voltage profile. That is, a difference between the corrected value of the second signal and the value of the second signal in the reference FOD voltage profile is obtained and the value of the second signal is moved in the opposite direction with reference to the reference FOD voltage profile by the difference as illustrated in FIG. 8.

Figure 9:
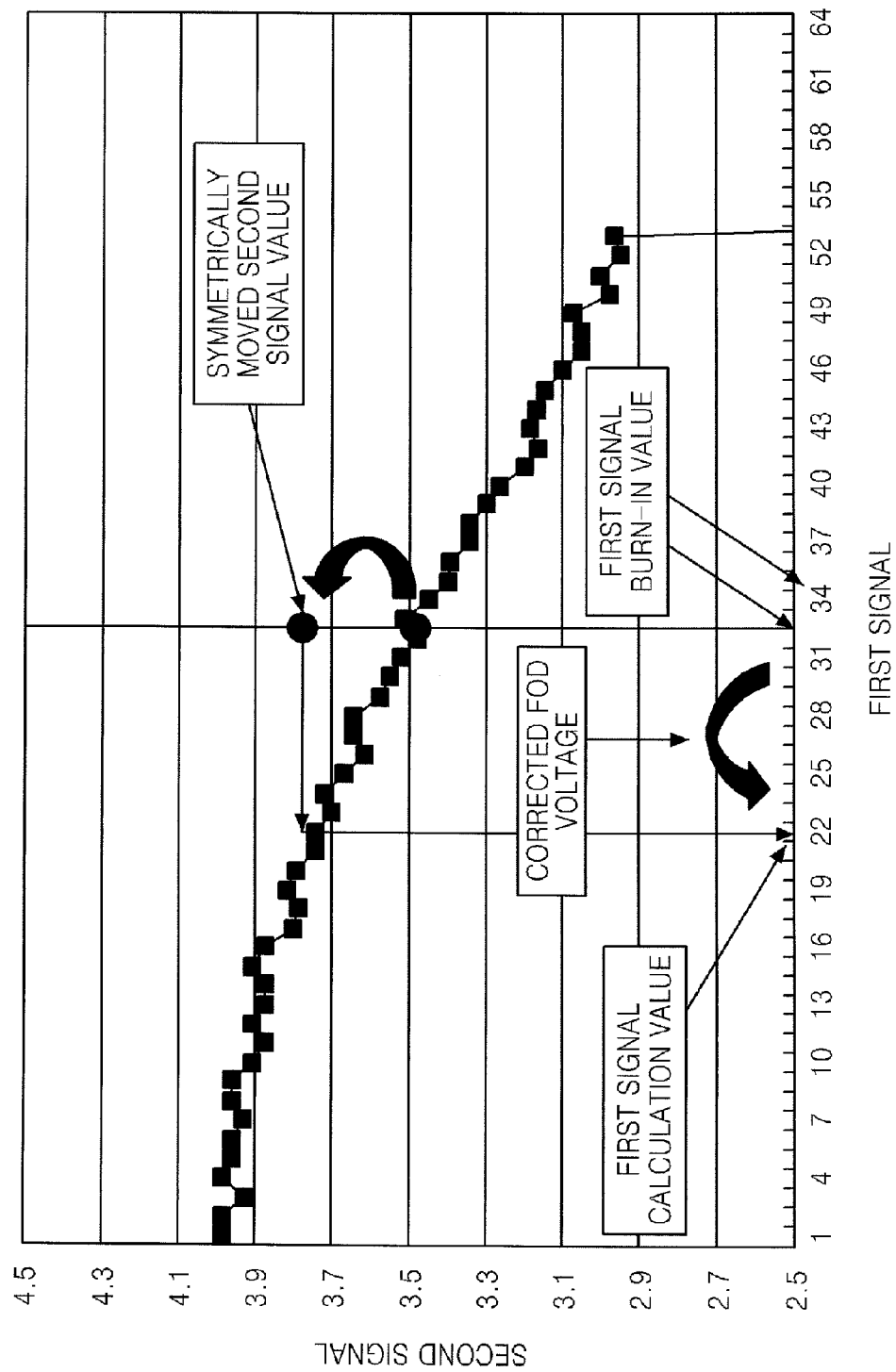

As illustrated in FIG. 9, a first signal calculation value that is the value of the first signal in the reference FOD voltage profile corresponding to the value of the second signal that is symmetrically moved as in FIG. 9, is calculated. Then, the corrected FOD voltage is calculated based on the difference between the first signal calculation value and a first signal burn-in value corresponding to the burn-in FOD value in the reference FOD voltage profile. That is, a target FOD voltage that is a new FOD voltage in the current (immediate) environment corresponding to the target FH of the magnetic head 21 can be calculated using the reference FOD voltage profile regardless of the factors, for example, the temperature, humidity, or altitude, affecting the current FH of the magnetic head 21. Thus, the corrected FOD voltage can be obtained by a difference in the burn-in FOD voltage from the target FOD voltage that is a new FOD voltage.

After obtaining the corrected FOD voltage, the FH of the magnetic head 21 is controlled by adding the corrected FOD voltage to the burn-in FOD voltage during a normal operation (operation S30). At this point, the actual applied FOD voltage is a sum of both the corrected FOD voltage and the burn-in FOD voltage.

In the present embodiment, the current temperature and time are also measured at an idle time (operation S40) of the magnetic head 21. When a difference between the current temperature and a temperature when the corrected FOD voltage is obtained is determined to exceed a preset range or a difference between the current time and a time when the corrected FOD voltage is obtained is determined to exceed a preset range (operation S50), the corrected FOD voltage is recalculated so as to be appropriately reflected for various environment changes. Otherwise, when the difference between the current temperature and a temperature when the corrected FOD voltage is obtained is determined not to exceed a preset range or a difference between the current time and a time when the corrected FOD voltage is obtained is determined not to exceed a preset range (operation S50), another read or write operation of the magnetic head 21 is performed using the previously calculated corrected FOD voltage of operation S20.

As described above, according to the embodiments of the present general inventive concept, regardless of environmental factors, for example, the temperature, humidity, or altitude, affecting the current FH of the magnetic head 21, an FOD voltage which can maintain a target FH in the current environment can be applied by correcting the difference between the actual FH of the magnetic head 21 in a user environment and the FH of the magnetic head 21 in the burn-in process. Thus, the FH of the magnetic head 21 can be accurately controlled and problems of weak write or head/disk interference (HDI) can be solved.

In the above-described embodiment, the method of controlling the FH of the magnetic head 21 is described as being performed by obtaining the corrected FOD voltage and adding the corrected FOD voltage to the burn-in FOD voltage to calculate the applied FOD voltage and by applying the applied FOD voltage. However, it is obvious that a method of controlling the FH of the magnetic head 21 can be used in which an FOD voltage that is a new FOD voltage in the current environment corresponding to the target FH of the magnetic head 21 is calculated using the reference FOD voltage profile and the FOD voltage that is the new FOD voltage is replaced by the burn-in FOD voltage and applied for the control of the FH of the magnetic head 21.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

As described above, according to the embodiments of the present general inventive concept, the influence of environmental factors, such as, for example, the temperature, humidity, or altitude, affecting the current FH of the magnetic head in a user environment can be effectively corrected so that the reliability in the read/write operations can be improved and the performance of the hard disk drive can be improved.

What is claimed is:

1. A method of controlling a flying height of a magnetic head of a hard disk drive, the method comprising:
    applying a burn in flying-on-demand (FOD) voltage to the magnetic head, the burn in FOD voltage corresponding to a reference FOD profile;
    measuring a corresponding flying height of the magnetic head;
    calculating a difference between the measured flying height and a target flying height of the reference FOD voltage profile, the reference FOD voltage profile being a profile of a second signal that determines a flying height of the magnetic head with respect to a first signal that determines an FOD voltage;
    calculating a corrected FOD voltage to correct the difference between the measured flying height and the target flying height; and
    applying an applied FOD voltage to the magnetic head obtained by applying the corrected FOD voltage to the burn-in FOD voltage.

2. The method of claim 1, wherein the calculating of the corrected FOD voltage comprises:
    measuring the second signal by applying the burn-in FOD voltage;
    correcting a value of the second signal measured at a current temperature to a value of the second signal measured at a temperature at which the reference FOD voltage profile is produced; and
    calculating the corrected FOD voltage to correct a difference between the burn-in flying height and the measured flying height that is calculated based on the corrected value of the second signal.

3. The method of claim 2, wherein, in the correcting of a value of the second signal measured at a current temperature to a value of the second signal at a temperature at which the reference FOD voltage profile is produced, the correction of the value of the second signal is performed based on a profile statistically calculated with respect to a plurality of magnetic heads and by matching the value of the second signal when the magnetic head touches down on a disk to a corresponding temperature.

4. The method of claim 2, wherein the temperature at which the reference FOD voltage profile is produced is preset and works as a reference temperature.

5. The method of claim 2, wherein the calculating the corrected FOD voltage to correct the difference between the burn-in flying height and the measured flying height that is calculated based on the corrected value of the second signal comprises:
    symmetrically moving the corrected value of the second signal with respect to the reference FOD voltage profile;
    calculating a first signal calculation value corresponding to the value of the second signal that is symmetrically moved; and
    calculating the corrected FOD voltage based on the difference between the first signal calculation value and a first signal burn-in value corresponding to the burn-in FOD voltage in the reference FOD voltage profile.

6. The method of claim 1, further comprising:
    after the calculating of the corrected FOD voltage and during an idle time of the hard disk drive, recalculating the corrected FOD voltage when a difference between a current temperature and a temperature when the calculating of a corrected FOD voltage is performed exceeds a preset range or a difference between a current time and a time when the calculating of a corrected FOD voltage is performed exceeds a preset range.

7. The method of claim 1, wherein the reference FOD voltage profile is produced in a burn-in process that is one of manufacturing processes of a hard disk drive and stored in a maintenance cylinder of a disk.

8. A method of controlling a flying height of a magnetic head of a hard disk drive, the method comprising:
    calculating a target flying on demand (FOD) voltage for a target flying height in an environment in which a measured flying height is measured by correcting a difference between the measured flying height measured by applying a burn-in FOD voltage corresponding to the target flying height and a burn-in flying height in a reference FOD voltage profile corresponding to the burn-in FOD voltage of the reference FOD voltage profile, the reference FOD voltage profile being a profile of a second signal to calculate the flying height of the magnetic head with respect to a first signal to calculate an FOD voltage that allows an end of the magnetic head to thermally expand and protrude; and
    applying the target FOD voltage to the magnetic head to control the flying height of the magnetic head.

9. A recording medium having recorded thereon a computer program executing a method of controlling a flying height of a magnetic head of a hard disk drive, the method comprising:
    calculating a corrected flying on demand (FOD) voltage to correct a difference between a measured flying height measured by applying a burn-in FOD voltage corresponding to a target flying height and a burn-in flying height of a reference FOD voltage profile corresponding to the burn-in FOD voltage of the reference FOD voltage profile, the reference FOD voltage profile being a profile of a second signal to calculate the flying height of the magnetic head with respect to a first signal to calculate an FOD voltage that allows an end of the magnetic head to thermally expand and protrude; and
    applying an applied FOD voltage to the magnetic head, the applied FOD voltage obtained by applying the corrected FOD voltage, to the burn-in FOD voltage, to control the flying height of the magnetic head.

10. A hard disk drive comprising:
    a magnetic head to record data on a disk or to reproduce recorded data from a disk; and
    a controller to calculate a corrected flying on demand (FOD) voltage to correct a difference between a measured flying height measured by applying a burn-in FOD voltage corresponding to a target flying height and a burn-in flying height of a reference FOD voltage profile corresponding to the burn-in FOD voltage of the reference FOD voltage profile, the reference FOD voltage profile being a profile of a second signal to calculate the flying height of the magnetic head with respect to a first signal to calculate an FOD voltage that allows an end of the magnetic head to thermally expand and protrude, and applying an applied FOD voltage to the magnetic head, the applied FOD voltage obtained by applying the corrected FOD voltage, to the burn-in FOD voltage, to control the flying height of the magnetic head.

11. The hard disk drive of claim 10, wherein the controller calculates the corrected FOD voltage to correct a difference between the burn-in flying height and the measured flying height using the reference FOD voltage profile by correcting a value of the second signal measured at a current temperature by applying the burn-in FOD voltage to a value of the second signal at a temperature at which the reference FOD voltage profile is produced, and using the flying height calculated by the corrected value of the second signal as the measured flying height.

12. The hard disk drive of claim 11, wherein the controller corrects the value of the second signal based on a profile statistically calculated with respect to a plurality of magnetic heads and by matching the value of the second signal when the magnetic head touches down on a disk to a corresponding temperature.

13. The hard disk drive of claim 11, wherein the temperature at which the reference FOD voltage profile is produced is preset and is a reference temperature.

14. The hard disk drive of claim 10, wherein, when it is an idle time of the hard disk drive, the controller recalculates the corrected FOD voltage when a difference between a current temperature and a temperature when the calculating of a corrected FOD voltage is performed exceeds a preset range or a difference between a current time and a time when the calculating of a corrected FOD voltage is performed exceeds a preset range.

15. The hard disk drive of claim 10, wherein the reference FOD voltage profile is produced in a burn-in process that is one of manufacturing processes of a hard disk drive and stored in a maintenance cylinder of a disk.

* * * * *